(12) United States Patent
Ng et al.

(10) Patent No.: US 8,417,839 B1
(45) Date of Patent: Apr. 9, 2013

(54) CONCURRENT ACTIONS FOR DATA STORAGE

(75) Inventors: Keow Seng Ng, Longmont, CO (US); Vincent Michael McGarry, Longmont, CO (US); Abhay Tejmal Kataria, Longmont, CO (US); Lace J. Herman, Longmont, CO (US); Dennis A. Rubsam, Denver, CO (US); Steven Scott Williams, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/076,579

(22) Filed: Mar. 31, 2011

Related U.S. Application Data

(63) Continuation of application No. 12/985,860, filed on Jan. 6, 2011, now abandoned.

(51) Int. Cl.
 *G06F 3/00* (2006.01)
 *G06F 1/26* (2006.01)
(52) U.S. Cl.
 USPC ............................................. 710/10; 713/300
(58) Field of Classification Search ...................... 710/10
 See application file for complete search history.

(56) References Cited

U.S. PATENT DOCUMENTS

| | | | | |
|---|---|---|---|---|
| 6,304,405 | B1* | 10/2001 | Asano et al. | 360/73.03 |
| 7,447,926 | B1* | 11/2008 | Burroughs et al. | 713/300 |
| 2002/0035704 | A1* | 3/2002 | Wilson | 714/6 |
| 2003/0115413 | A1* | 6/2003 | Wood et al. | 711/114 |
| 2005/0149673 | A1* | 7/2005 | Suzuki et al. | 711/114 |
| 2005/0289364 | A1* | 12/2005 | Strong et al. | 713/300 |
| 2006/0294269 | A1* | 12/2006 | Duerk et al. | 710/62 |
| 2007/0088879 | A1* | 4/2007 | Huang et al. | 710/74 |

\* cited by examiner

*Primary Examiner* — Henry Tsai
*Assistant Examiner* — Titus Wong
(74) *Attorney, Agent, or Firm* — Cesari & Reed, LLP; Kirk A. Cesari

(57) ABSTRACT

The disclosure is related to systems and methods of concurrent actions for data storage. A controller may be configured to initialize a first data storage medium and a second data storage medium. The controller may receive a command when the first data storage medium is initialized but before the second data storage medium is initialized. The controller may service the command when the command utilizes the first data storage medium and the initialization for the second data storage medium is not complete. A controller may also be configured to send an indicator to a host that the system is ready to receive commands when a first data storage device is initialized, but a second data storage device is still in an initialization process.

21 Claims, 4 Drawing Sheets

CONCURRENT ACTIONS FOR DATA STORAGE

CROSS-REFERENCE TO RELATED APPLICATION

The present application is a continuation of and claims priority of U.S. patent application Ser. No. 12/985,860 filed on Jan. 6, 2011.

BACKGROUND

The present disclosure is generally related to concurrent actions for data storage.

DETAILED DESCRIPTION

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present disclosure.

Figure 1:
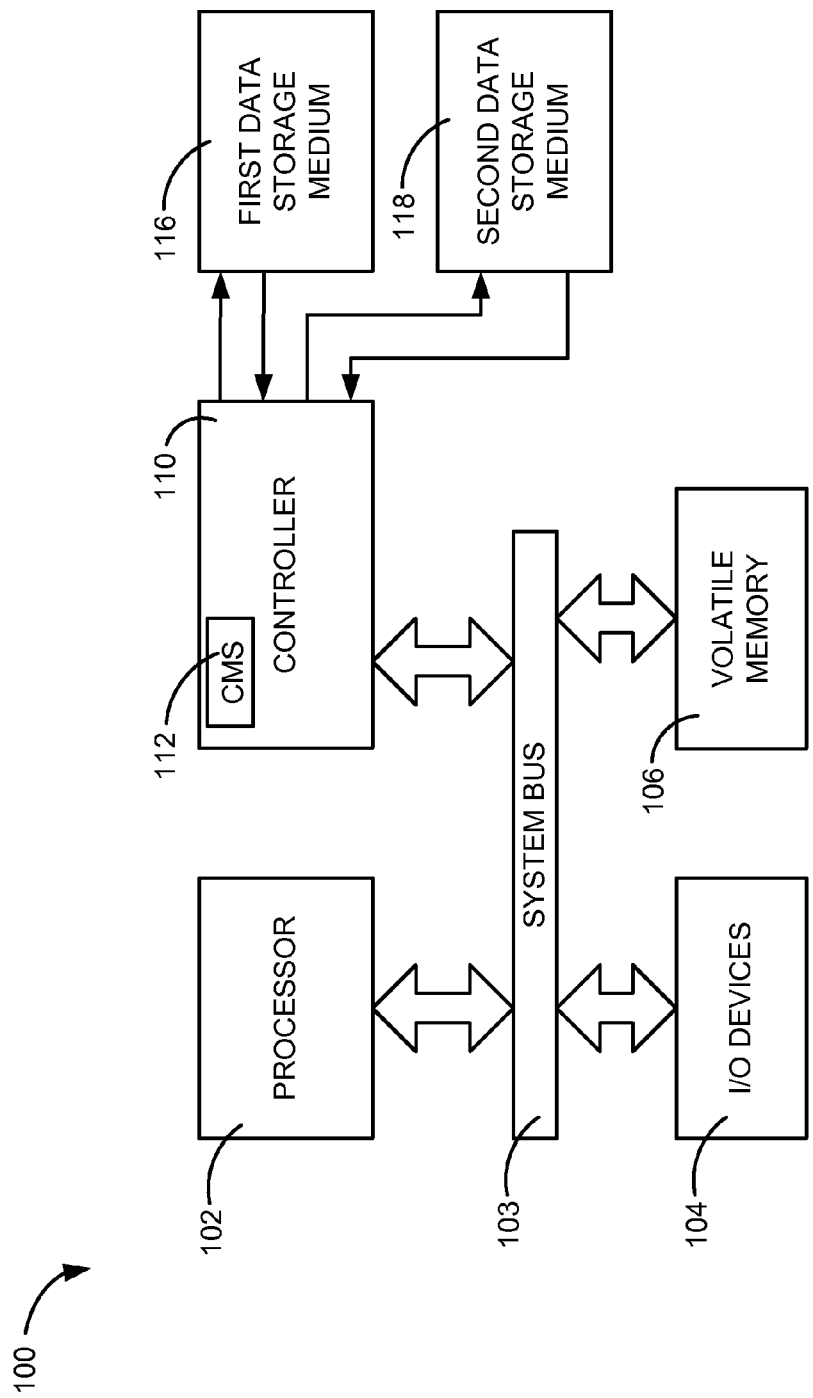
FIG. 1 is a diagram of an illustrative embodiment of a system for concurrent actions for data storage.

Referring to FIG. 1, a particular embodiment of a system for concurrent actions for data storage is shown and generally designated 100. The system 100 can be a desktop computer, a laptop computer, a server, a personal digital assistant (PDA), a telephone, a music player, another electronic device, or any combination thereof. The system 100 may also be referred to as a host or host computer. The system 100 may include a processor 102, that may be a central processing unit (CPU), controller, digital signal processor, reduced instruction set computer (RISC), application specific integrated circuit (ASIC), and the like, or any combination thereof. Although shown with one processor 102, the system 100 may include multiple processors. The processor 102 may be connected to a system bus 103 which also can be connected to input/output (I/O) devices 104, such as a keyboard, monitor, modem, storage device, or pointing device. The system bus 103 may also be coupled to a memory 106, which may be a random access volatile memory, such as dynamic random access memory (DRAM). The system bus 103 may also be coupled to a controller 110. The controller 110 may include a concurrent management system 112 adapted to implement concurrent actions for data storage.

The system 100 may also contain a first data storage medium 116 and a second data storage medium 118. In a particular embodiment, the first data storage medium 116 and the second data storage medium 118 are both non-volatile memory and different types of memory, that is the first data storage medium 116 and the second data storage medium 118 do not have identical data storage characteristics and physical construction. For example, the first data storage medium 116 may be a solid state nonvolatile memory, such as a Flash memory, and the second data storage medium 118 may be a disc data storage medium, such as magnetic disc. Both the first data storage medium 116 and the second data storage medium 118 may include multiple integrated circuit memory chips. For example, the first data storage medium 116 may be Multi-Level Cell (MLC) NAND Flash memory or Single-Level Cell (SLC) NAND Flash memory.

The controller 110 may communicate with the processor 102 via an interface (not shown) adapted to receive commands and data from the processor 102. Further, the controller 110 may be configured to implement the concurrent management system 112 via the controller 110 independent of the processor 102 or any other hardware or function of the system 100. In a particular embodiment, in addition to implementing and managing the concurrent management system 112, the controller 110 may also be a data storage controller. The controller 110 may comprise a single controller or may be multiple controllers, such as a separate, either functionally or physically, controller for each of the data storage media. In another particular embodiment, the controller 110 can be located in a data storage device that is electrically and physically removable from the system 100 via an interface connector (not shown). Further, the first data storage medium 116 and the second data storage medium 118 may be within a single enclosure of one data storage device or may be within separate enclosures of separate data storage devices. For example, the first data storage medium 116 may be a solid state memory module and the second data storage medium 118 may be a rotating disc drive, where such they are both separately removable from the system 100, such that the solid state memory module is not within the base enclosure of the rotating disc drive or vice versa.

During operation, the processor 102 may send a command to the controller 110 to retrieve or store data. The controller 110 can receive the command from the processor 102 and determine a physical location of data corresponding to a logical block address (LBA) associated with the command via a mapping system (not shown). The controller 110 can also implement the concurrent management system 112.

The concurrent management system 112 may initialize the first data storage medium 116 and the second data storage medium 118. Such initializations may occur after a power on event, a power reset event, or after receipt of a command. The initializations may occur concurrently, that is the timing of the initializations may overlap. In one embodiment, the first data storage medium 116 can be have its initialization routine started first and the initialization process for the second data storage medium 118 may be started while the first data storage medium 116 is still being initialized.

The controller 110 may notify the processor 102 that the controller is ready to process data storage commands when the first data storage medium is initialized and the second data storage medium has not yet completed an initialization routine or is otherwise unavailable. The first data storage medium 116 may have a relatively fast initialization time to be ready to read and write data, where the second data storage medium 118 may have a comparatively slower initialization time to be ready to read and write data.

In one embodiment, the first data storage medium 116 can be a solid state nonvolatile memory and the second data storage medium 118 may be magnetic disc(s). A solid state memory may take less time than a magnetic disc to be initialized to allow reading or writing to the data storage medium. For example, a NAND Flash device may take about 600 milliseconds to initialize, while a magnetic disc may take about 4.5 seconds.

The controller 110 may notify the processor 102 by sending an indicator, such as a drive ready indicator, to the processor 102 (or host) that the controller 110 is ready to receive commands when the first data storage medium 116 is initialized, but the second data storage medium 118 is still in an initialization process. This can allow the processor 102 to start sending data storage commands to the controller 112 earlier than would be possible than if the controller waited until the second data storage medium 118 was initialized to allow reading or writing. Further, the controller 110 may not notify the processor 102 that the initialization process for the second data storage medium 118 is not complete when the ready indicator is sent. That is, the processor 102 may not be aware that the second data storage medium 118 is not yet ready to read or write data when the processor 102 receives the ready indicator from the controller 110.

Once the ready indicator has been sent by the controller 110, the processor 102 may send data storage commands, such as read or write commands, for the controller 110 to process. After the indicator has been sent but before the initialization process for the second data storage medium 118 is complete, the controller 110 and the concurrent management system 112 may manage the received commands by servicing a received command when the command utilizes the first data storage medium 116. During the period after the indicator has been sent but before the initialization process for the second data storage medium 118 is complete, a command that requires utilizing the second data storage medium 118 may not be serviced; such a command may be stored in a command queue, such as a nonvolatile command queue, or rejected from being processed. If a command is rejected, a notice may be sent to the host, or processor 102, indicating a command was rejected.

The controller 110 or concurrent management system 112 may provide data to the processor 102 in response to a read request when the data corresponds to at least one logical block address stored in the first data storage medium 116, even if the initialization process for the second data storage medium 118 is not complete.

Figure 2:
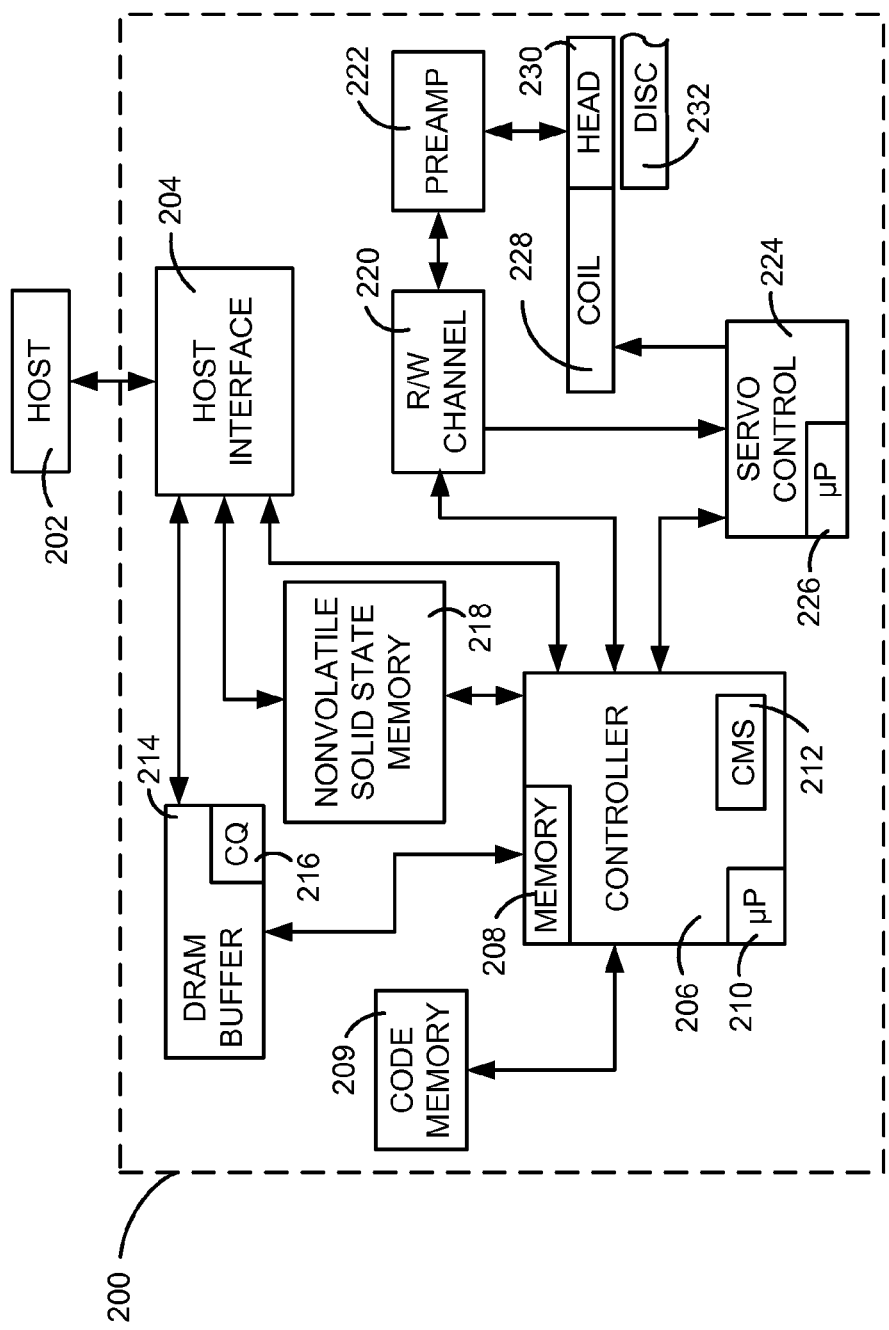
FIG. 2 is a diagram of another illustrative embodiment of a system for concurrent actions for data storage.

Referring to FIG. 2, a particular embodiment of a data storage device is shown and generally designated 200, the data storage device 200 may include the controller 110 shown in FIG. 1. The data storage device 200 can communicate with a host device 202 (such as the processor 102 shown in FIG. 1) via an interface 204 that may include a connector that allows the data storage device 200 to be physically removed from the host 202. The interface 204 may include hardware circuits, logic, firmware, or any combination thereof. In a particular embodiment, the interface 204 comprises an interface that allows attachment of a data storage device to another computer system, such as USB, IEEE 1394, Compact Flash, SATA, eSATA, PATA, SCSI, SAS, or Fiber Channel. The data storage device 200 may be internal or external to an enclosure of the host 202.

The data storage device 200 can include a programmable controller 206 with associated memory 208 and processor 210. The programmable controller 206 may be coupled to a memory 209 and buffer 214. The memory 209 may be a nonvolatile solid state memory, such as Serial Flash, that is capable of storing firmware code, or boot code, to allow the controller to perform functions of the data storage device 200, such as a spin-up sequence for the disc 232. The buffer 214 can temporarily store user data during read and write operations and can include a command queue (CQ) 213 where multiple pending access operations can be temporarily stored pending execution. The CQ 213 may be located in a nonvolatile memory or a volatile memory.

Further, FIG. 2 further shows the data storage device 200 to include a read/write (R/W) channel 220 which encodes data during write operations and reconstructs user data retrieved from disc(s) 232 during read operations. A preamplifier/driver circuit (preamp) 222 applies write currents to the head(s) 230 and provides pre-amplification of readback signals. A servo control circuit 224 uses servo data to provide the appropriate current to the coil 228 to position the head(s) 230. The controller 206 can communicate with a processor 226 to move the head(s) 230 to the desired locations on the disc(s) 232 during execution of various pending commands in the command queue 216.

In a particular embodiment, the data storage device 200 may also include a nonvolatile solid state memory 218. Further, the data storage device 200 may also include, a concurrent management system 212, which may be firmware, logic, or circuits internal to the controller 206 or may be external to the controller 206. The concurrent management system 212 may include logic or instructions to perform concurrent management of actions for the data storage device 200. The actions may include concurrent processing of read/write commands from the host while initializing the disc 232, such as a spin-up process. A concurrent management system, as describe herein, may be beneficial when a system, such as data storage device 200, has two types of memories that have different data storage characteristics, such as nonvolatile solid state memory 218 and disc(s) 232, where the nonvolatile solid state memory 218 has a faster read access time than the disc(s) 232.

During operation, the controller 206 may be configured to initialize the nonvolatile solid state memory 218 and start an initialization process for the disc(s) 232. The initialization process for the disc(s) 232 may be started while the initialization process for the nonvolatile solid state memory 218 is processing. The nonvolatile solid state memory 218 may be initialized in a first period of time and the initialization process for the disc(s) 232 may take at least a second period of time that is longer than the first period of time. Once the solid state memory 218 is initialized, whether or not the disc(s) 232 are ready to be read or written to, the data storage device 200 may notify the host 202 that the data storage device 200 is ready to receive data storage commands, such as by sending an indicator of a ready status.

When the first data storage medium is initialized but before the initialization process for the second data storage medium is complete, the data storage device 200 may receive a command from the host 202 and service the command when the command utilizes the nonvolatile solid state memory 218. The controller 206 may determine if the command utilizes the nonvolatile solid state memory 218 or the disc(s) 232. The command may be processed during this period when no data is needed from the disc(s) 232 and all the data necessary to process the command is stored in the nonvolatile solid state memory 218. If, during this period, a command is received that utilizes the disc(s) 232, then the controller 206 and concurrent management system 212 may store the command in the command queue 216 for later processing or reject the command for processing. The controller 206 may also determine if a command is a read command, a write command, or another type of command and service the command when it is another type of command, other than a read or write command, regardless of whether the initialization process for the disc(s) 232 is complete.

Figure 3:
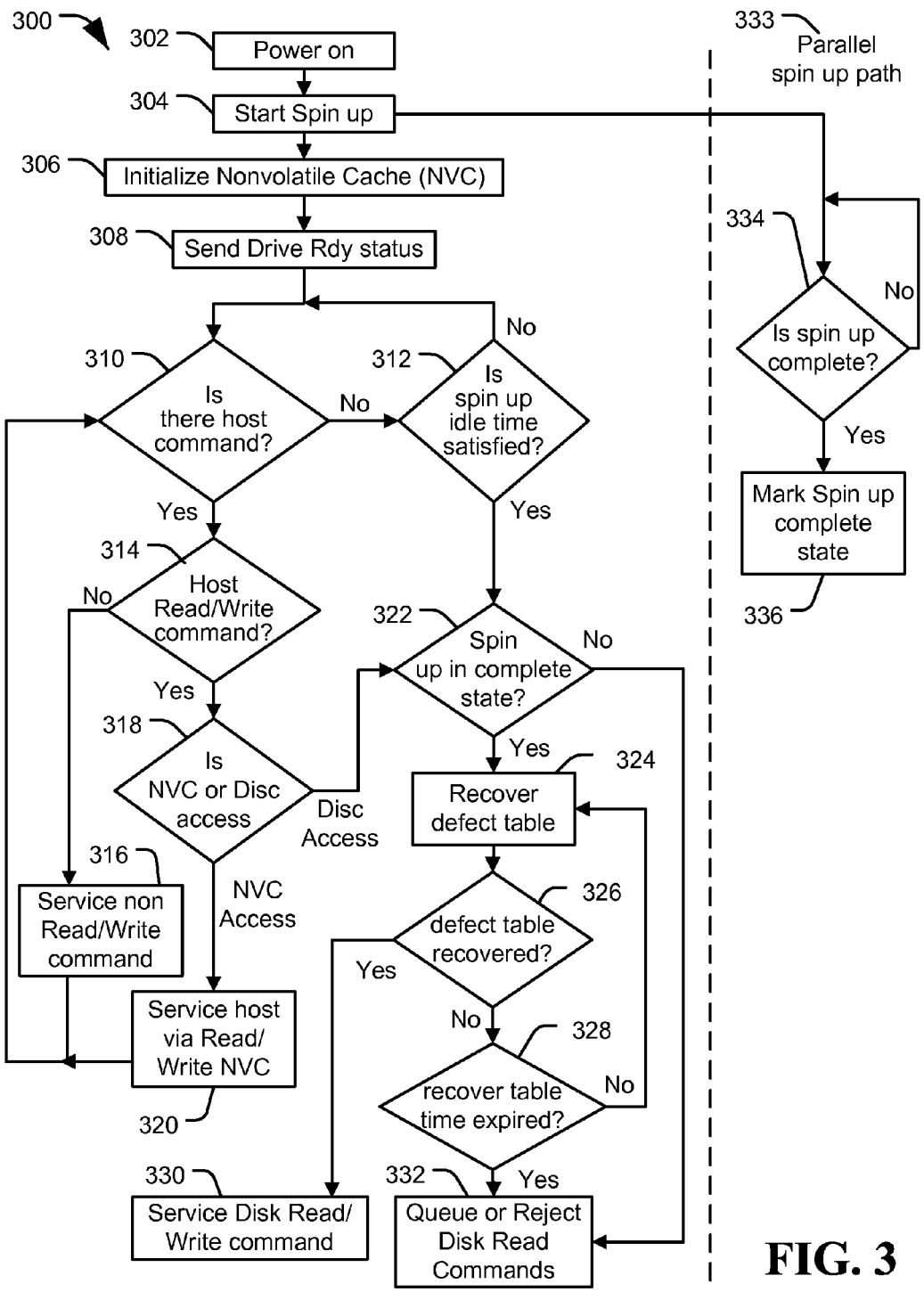
FIG. 3 is a flowchart of an illustrative embodiment of a method showing concurrent actions for data storage.

Referring to FIG. 3, a flowchart of an illustrative embodiment of a method showing concurrent actions for data storage is shown and generally designated 300. The method 300 may be used by a data storage device or system that has two memories, where the first memory has a first initialization time and the second memory has a longer initialization time.

One example, a data storage device having a nonvolatile data cache in a solid state memory and a rotatable disc will be described with respect to method 300. The method 300 can be applied to a data storage system via a hardware circuit, programmable controller, or other means.

The method 300 may begin when a start state occurs, such as a power on or power reset event, at 302. Further, the start state could occur upon another type of trigger, such as a command from a host. The method 300 may then start the spin-up of the rotatable disc, at 304, and start initializing the nonvolatile cache (NVC), at 306. The NC may be a solid state data storage medium or device. The timing of the spin-up starting and the initialization of the nonvolatile cache may be simultaneous, or one may start relatively soon after the other starts. For example, the spin-up may start slightly after the initialization of the nonvolatile cache, such that the initialization and the spin-up occur concurrently.

After the spin-up has started, the method 300 may proceed to a parallel spin-up path 333, which occurs concurrent to at least some of the actions of method 300 that are on the left side of the dashed line in method 300. The parallel spin-up path 333 can include spinning up the rotatable disc until it is at a desired revolutions per minute (RPM), such as an RPM at which data could be read or written to the disc. The parallel spin path 333 can include determining if the spin-up is complete, at 334. When spin-up is complete, an indicator can be set that the spin-up is complete, at 336, such as a register in a memory or other type of indicator. However, the disc may not be readable until the defect table(s) are recovered, as described below.

While the parallel spin-up path 333 is occurring, the data storage device can be initializing the NVC, at 306, and once the NVC is initialized, a data storage device ready status indicator can be sent to the host, at 308. The ready status indicator can be sent to the host regardless of whether the spin-up complete indicator has been set. The data storage device may then be in a ready state to receive commands from the host. If a command is not received from the host, the method 300 may determine if a spin-up idle time is satisfied, at 312. If the spin-up idle time is not satisfied, the process repeats, to 310.

Once in the ready state, the method 300 may await a command from the host, at 310. If a command is received, method 300 may determine if the command is a read or write command, at 314. If the command is not a read or write command, the command may be serviced, at 316. If the command is a read or write command, the method 300 may determine if the read or write command requires NVC access or disc access, at 318. Whether a command requires NVC access or disc access can be determined by checking a logical block address (LBA) mapping to determine if a LBA associated with a specific command is stored in the NVC or the disc. If a copy of a needed LBA is stored in the NVC, or if the command is a write command, the command can be serviced, at 320, whether or not the spin-up for the disc is complete.

When a command requires disc access, at 318, or if the spin-up idle time is satisfied, at 312, the method 300 may determine if the spin-up is complete, at 322. The method 300 may determine if the spin-up is complete by checking for a register setting indicating the spin-up is complete. If the spin-up is not complete, the method 300 may queue the command, such as in a nonvolatile command queue, or reject the command, at 332.

When the spin-up has completed, the method 300 may recover one or more defect tables associated with the disc, at 324. If the defect table(s) is recovered successfully, at 326, then the method 300 may process the command to read or write to the disc, at 330. If the defect table(s) are not recovered successfully, at 326, the method 300 may determine if a time period for recovering the defect table has expired, 328. If the time period has not expired, then the method 300 may retry recovering the defect table, at 324. If the time period for recovering the defect table has expired, the method 300 may queue the command, such as in a nonvolatile command queue, or reject the command, at 332.

Once the spin-up of the disc is complete, and the defect table(s) are recovered, the data storage device may service read or write commands whether or not the commands access the NVC or the disc. During the method 300, the host may be unaware that the disc is not ready to read or write data once the ready status indicator has been sent to it. However, in some implementations, the data storage device may make the host aware of which data storage medium or which type of data storage medium is ready for servicing commands.

Figure 4:
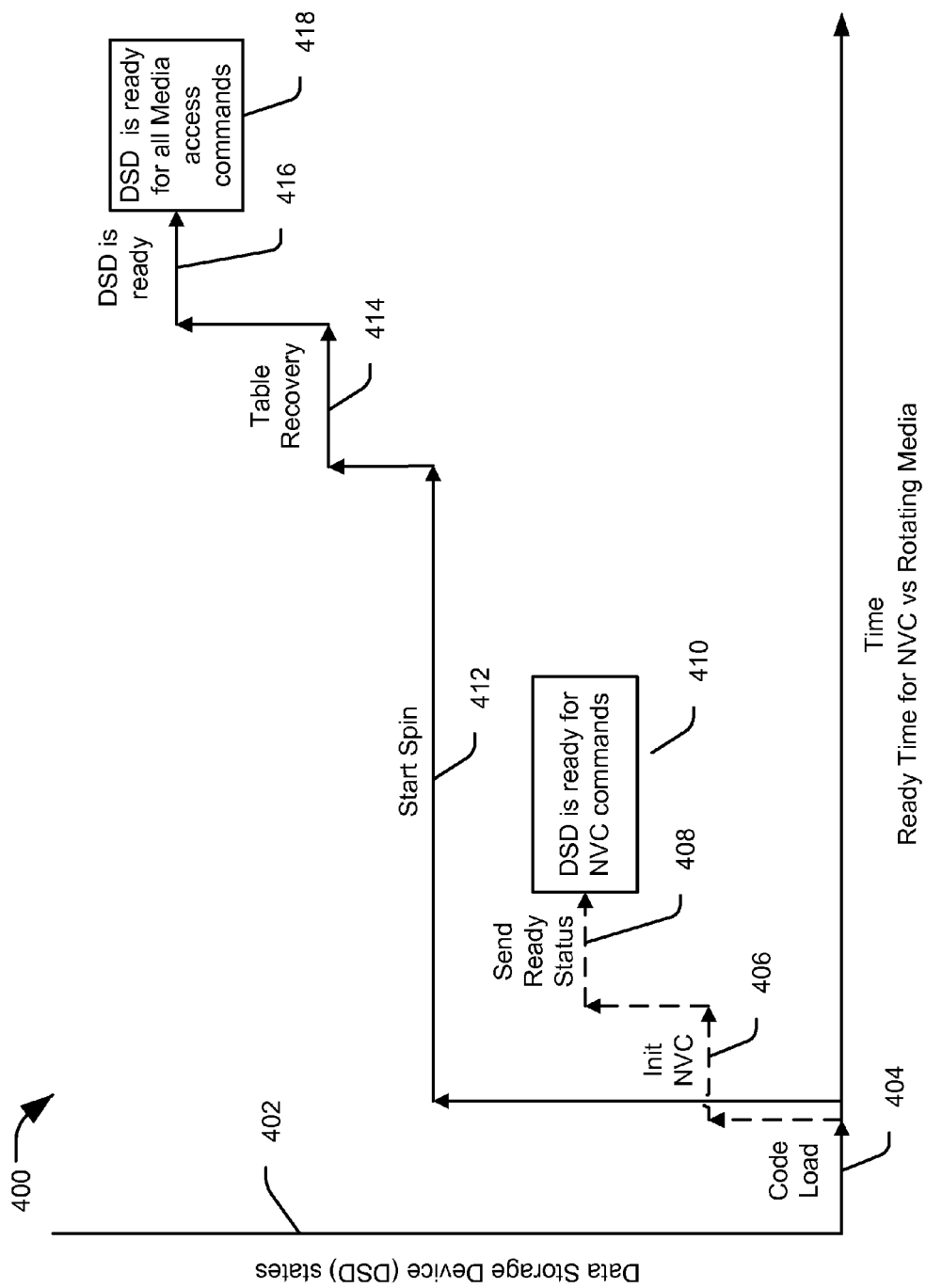
FIG. 4 is a diagram of an illustrative embodiment of a timing state diagram of concurrent actions for data storage.

Referring to FIG. 4, an illustrative embodiment of a timing state diagram of concurrent actions for data storage is shown and generally designated 400. The levels represent different states of the data storage mediums and the axis 404 represents time. The solid line represents the states and relative timing of a rotating disc data storage medium and the dashed line represents the states and relative timing of a nonvolatile solid state storage medium (NVSSM), such as NAND Flash.

A trigger event 402 may occur that starts an initialization routine of both the rotating disc data storage medium and the nonvolatile solid state storage medium, The trigger event may be a power on state, a power reset state, a command from a host, or another trigger. The initialization routines may include loading code, at 404, into a memory of a controller to execute the rest of the initialization routines.

Once the code is loaded, the NVSSM initialization routine can initialize the NVSSM as a nonvolatile data cache (which may be the same as the NVC described herein), at 406. Once the NVSSM is initialized, the NVSSM initialization routine can send a ready status to the host, at 408. The data storage device can then be ready for commands that access data in the NVSSM, or may store write requests in a nonvolatile data cache of the NVSSM.

While the NVSSM is being initialized, the rotating disc data storage medium may start spinning, at 412. Defect table(s) may then be recovered for the rotating disc data storage medium, at 414. Once the defect table(s) are recovered, the rotating disc data storage medium is ready, at 416, and the data storage device is ready to process all media access commands from the host, at 418.

When data access commands that require data from the rotating disc data storage medium are received at the data storage device prior to the data storage device being ready for all commands, at 418, such data access commands may be queued for later processing or may be rejected by the data storage device.

In accordance with various embodiments, the methods described herein may be implemented as one or more software programs running on a computer processor or controller, such as the processor 102, the controller 110, or the controller 206. Dedicated hardware implementations including, but not limited to, application specific integrated circuits, programmable gate arrays, and other hardware devices can likewise be constructed to implement the methods described herein. The systems and methods described herein can be applied to any type of data storage system that could use concurrent actions on a data storage device.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

The illustrations and examples provided herein are but a few examples of how the present disclosure can be applied to data storage systems. There are many other contexts in which the methods and systems described herein could be applied to computing systems and data storage systems. For example, the methods and systems described herein are particularly useful for computing systems and data storage devices having more than one type of non-volatile memory, such as when the computing systems or the data storage devices have at least two non-volatile data stores that are not identical in storage characteristics and physical construction.

An example of another system in which the examples discussed herein could be useful can include a computer system where a first non-volatile memory and a second non-volatile memory are physically separate devices, (e.g. separately removable from the computer system), yet they are managed, such as by a processor of the computer system or a controller of one of the data storage devices, to implement the methods and systems described herein. In a particular embodiment, a first nonvolatile memory of a first type may be directly connected to a motherboard (where a CPU of the computer system resides) and a second nonvolatile memory of a second type may also be directly connected to the motherboard. A controller or processor on the motherboard may manage the data storage operations for the first nonvolatile memory, the second nonvolatile memory, or any combination thereof. Further, each data storage device may include a separate controller or processor to manage the data storage operations for their respective data storage media. Even further, a controller or processor within one of the data storage devices may manage data storage operations for both the first and second nonvolatile memories. Both the first and the second nonvolatile memories may be user-removable from the motherboard in the form of a connector, may be semi-permanently connected to the motherboard, such as via a circuit board or direct wiring with no user-removable connector, or any combination thereof.

In another particular embodiment, a first nonvolatile memory of a first type may be directly connected to the motherboard and a second nonvolatile memory of a second type may be directly connected to the first nonvolatile memory. The first non-volatile memory and the second nonvolatile memory may both be in a single enclosure or may be in two separate enclosures, each of which may be user-removable from the computer system and each other. In such an example, a controller or processor of the first nonvolatile memory may manage the data storage operation of the second nonvolatile memory.

In some embodiments, a nonvolatile command queue is particularly useful to receive data storage commands from a host. The nonvolatile command queue may be located within a first data storage device, a second data storage device, on a motherboard, or any combination thereof. Further, the nonvolatile command queue may be implemented within any memory structure that is nonvolatile and can be used for queuing commands.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A device comprising:
a controller configured to:
start an initialization process for a first data storage medium, the initialization process bringing the first data storage medium from a non-operational state to an operational state that is able to store data to the first data storage medium;
start an initialization process for a second data storage medium;
send an indicator from the device to a host indicating that the device is ready to receive commands when the first data storage medium is in the operational state but the second data storage medium is in a non-operational state that is not able to store data to the second data storage medium;
receive a command when the first data storage medium is in the operational state but the second data storage medium is in the non-operational state;
service the command when the command utilizes the first data storage medium and the second data storage medium is in the non-operational state; and
not service the command when the command utilizes the second data storage medium and the second data storage medium is in the non-operational state.

2. The device of claim 1, wherein the controller is further configured to:
start the initialization process for the second data storage medium before the the first data storage medium is in the operational state.

3. The device of claim 1, wherein the first data storage medium reaches the operational state in a first period of time and the second data storage medium reaches the operational state in a second period of time that is longer than the first period of time.

4. The device of claim 1, wherein the controller is further configured to:
determine if the command utilizes the first data storage medium or the second data medium.

5. The device of claim 1, wherein the controller is further configured to:
determine if the command is a read command or a write command;
determine if the command is another type of command other than a read command or a write command; and
service the command when it is the another type of command regardless of whether the second data storage medium is in the operational state.

6. The device of claim 1, wherein the initialization process includes:
recovering a defect list that identifies defective storage locations of the second data storage medium.

7. The device of claim 1, further comprising:
the first data storage medium includes a nonvolatile data storage medium; and
the second data storage medium includes a nonvolatile data storage medium, wherein the second data storage medium has at least one different data storage characteristic than the first data storage medium.

8. The device of claim 7, wherein the at least one different data storage characteristic comprises a read access time.

9. The device of claim 8, wherein the first data storage medium is a nonvolatile solid state memory and the second data storage medium is a disc data storage medium.

10. The device of claim 9, wherein the first data storage medium and the second data storage medium are both attached to a single data storage device that can be removed from the host via an interface connector.

11. A system comprising:
a controller configured to:
start an initialization process for a first data storage device and a second data storage device, the initialization process bringing the first data storage device and second data storage device from a non-operational state that is not able to store data to an operational state that is able to store data;
send an indicator to a host that the system is ready to receive commands when the first data storage device is in the operational state, but the second data storage device is in the non-operational state;
receive a command when the first data storage device is in the operational state but the second data storage device is in the non-operational state; and
service the command via the first data storage device when the second data storage device is in the non-operational state.

12. The system of claim 11, wherein the host is not notified that the second data storage device is in the non-operational state when the indicator is sent.

13. The system of claim 11, wherein the controller is further configured to:
provide data to the host in response to a read request when the data corresponds to at least one logical block address stored in the first data storage device and the second data storage device is in the non-operational state.

14. The system of claim 11, wherein the controller is further configured to:
start the initialization process for the first data storage device; and
start the initialization process for the second data storage device before the first data storage device is in the operational state.

15. The system of claim 11, further comprising:
the first data storage device comprises a first nonvolatile memory; and
the second data storage device comprises a second nonvolatile memory having a slower initialization time from a power on event than the first data storage device.

16. The system of claim 15, wherein the first data storage device is a nonvolatile solid state memory device and the second data storage device is a disc data storage device.

17. A method comprising:
initializing a first data storage medium, the initialization including changing the first data storage medium from a non-operational state to an operational state that is able to store data to the first data storage medium;
starting an initialization process for a second data storage medium;
sending an indicator from a system including the first data storage medium to a host that the system is ready to receive commands when the first data storage medium is in the operational state but the second data storage medium is in a non-operational state that is not able to store data to the second data storage medium;
receiving a command when the first data storage medium is in the operational state but the second data storage medium is in the non-operational state;
servicing the command when the command can be completed using the first data storage medium and the second data storage medium is in the non-operational state; and
not servicing the command when the command cannot be completed without using the second data storage medium and the second data storage medium is in the non-operational state.

18. The method of claim 17, further comprising:
determining if the command is a read command or a write command;
determining if the command is another type of command other than a read command or a write command; and
servicing the command when it is the another type of command and the second data storage medium is in the non-operational state.

19. The method of claim 17, further comprising:
providing data to the host in response to a read request when the data corresponds to at least one logical block address stored in the first data storage medium and the second data storage medium is in the non-operational state.

20. The device of claim 1, wherein the controller is further configured to:
provide data in response to a read request when the data corresponds to at least one logical block address stored in the first data storage medium and the second data storage medium is in the non-operational state.

21. The method of claim 17, wherein the system further comprises a single removable data storage device comprising the first data storage medium and the second data storage medium.

* * * * *